(12) United States Patent
    Fohrenkamm et al.

(10) Patent No.: US 10,730,426 B2
(45) Date of Patent: Aug. 4, 2020

(54) METHOD AND KITS FOR CONVERTING A TWO SEAT UTILITY VEHICLE TO A FOUR SEAT CONFIGURATION AND FOR PROVIDING AN EXTENDED BED THEREON

(71) Applicant: The Toro Company, Bloomington, MN (US)

(72) Inventors: Jeremy A. Fohrenkamm, River Falls, WI (US); Gordon R. Schmidt, Farmington, MN (US); David A. Plautz, Woodbury, MN (US); Timothy P. McLeod, Cottage Grove, MN (US); Jamie R. Larson, Farmington, MN (US); Erik A. Wiebold, Shakopee, MN (US)

(73) Assignee: The Toro Company, Bloomington, MN (US)

( * ) Notice: Subject to any disclaimer, the term of this patent is extended or adjusted under 35 U.S.C. 154(b) by 144 days.

(21) Appl. No.: 16/140,087

(22) Filed: Sep. 24, 2018

(65) Prior Publication Data

US 2019/0023173 A1    Jan. 24, 2019

Related U.S. Application Data

(62) Division of application No. 15/391,572, filed on Dec. 27, 2016, now Pat. No. 10,081,290.

(51) Int. Cl.
    *B60P 3/34*    (2006.01)
    *B60P 3/42*    (2006.01)
    (Continued)

(52) U.S. Cl.
    CPC ............ *B60P 3/42* (2013.01); *A01B 51/02* (2013.01); *B60P 3/423* (2013.01); *B62D 33/0273* (2013.01); *B62D 47/003* (2013.01)

(58) Field of Classification Search
    CPC .... A63B 21/154; B60N 2/3011; B60N 2/286; B60N 2/2821; B60N 2/2839;
    (Continued)

(56) References Cited

U.S. PATENT DOCUMENTS 5,195,795 A * 3/1993 Cannera ............... B60N 2/0292
                                                       296/65.09
5,839,773 A * 11/1998 Ban ..................... B60N 2/3011
                                                       296/65.09
(Continued)

*Primary Examiner* — Kiran B Patel
(74) *Attorney, Agent, or Firm* — James W. Miller

(57) ABSTRACT

A utility vehicle has a frame that is separable at a location passing through an operator compartment of the vehicle into front and rear sections with the seat base and seat assembly of the operator compartment remaining with the rear section and the rest of the operator compartment remaining with the front section. A seat extension kit is provided having a frame extension, a seat module, and a floorboard module that may be inserted between the split front and rear sections with the frame extension being fastened to such sections using preexisting fastener holes in the vehicle frame and the frame extension. When so inserted, the seat module forms a new front row of seating with the floorboard module extending between the seat module and the original seat base and seat assembly, which now form a rear row of seating. This expands the vehicle seating capacity from two people to four people.

10 Claims, 8 Drawing Sheets

(51) Int. Cl.
*A01B 51/02* (2006.01)
*B62D 47/00* (2006.01)
*B62D 33/027* (2006.01)

(58) Field of Classification Search
CPC .... B60N 2/01583; B62K 3/005; A47K 13/10; A61G 5/00
See application file for complete search history.

(56) References Cited

U.S. PATENT DOCUMENTS

| | | | | |
|---|---|---|---|---|
| 5,979,964 A * | 11/1999 | Ban | ................... | B60N 2/3011 296/65.09 |
| 6,199,894 B1 * | 3/2001 | Anderson | ............. | B62D 61/12 280/638 |
| 6,213,531 B1 * | 4/2001 | Corey | ................... | B60P 3/34 296/190.02 |
| 7,287,779 B2 * | 10/2007 | Miller | .................. | B62D 31/00 280/781 |
| 8,540,272 B1 * | 9/2013 | Vitale | .................. | B62D 47/003 280/638 |
| 8,585,116 B2 * | 11/2013 | King | ..................... | B62D 33/03 296/24.33 |
| 8,783,754 B1 * | 7/2014 | Peterson | ............. | B60N 2/3013 296/66 |
| 9,327,632 B1 * | 5/2016 | Bartel | ..................... | B60P 1/34 |
| 9,352,496 B2 * | 5/2016 | Takahashi | ............ | B60R 21/026 |
| 9,713,988 B2 * | 7/2017 | Vertanen | ................. | B60P 3/40 |
| 9,731,775 B1 * | 8/2017 | Tsumiyama | ........... | B60R 9/065 |
| 9,944,320 B1 * | 4/2018 | Tsumiyama | .......... | B60K 17/04 |
| 2009/0200823 A1 * | 8/2009 | Vertanen | ................. | B60P 3/40 296/26.08 |
| 2010/0314191 A1 * | 12/2010 | Deckard | ................. | B60N 2/01 180/312 |
| 2011/0156421 A1 * | 6/2011 | Naruoka | ................. | B60N 2/3022 296/26.1 |
| 2014/0265285 A1 * | 9/2014 | Erspamer | ............. | B60N 2/6009 280/783 |
| 2017/0174069 A1 * | 6/2017 | Oyama | .................. | B60K 6/24 |
| 2017/0297627 A1 * | 10/2017 | Deckard | ................. | B60N 2/01 |

* cited by examiner

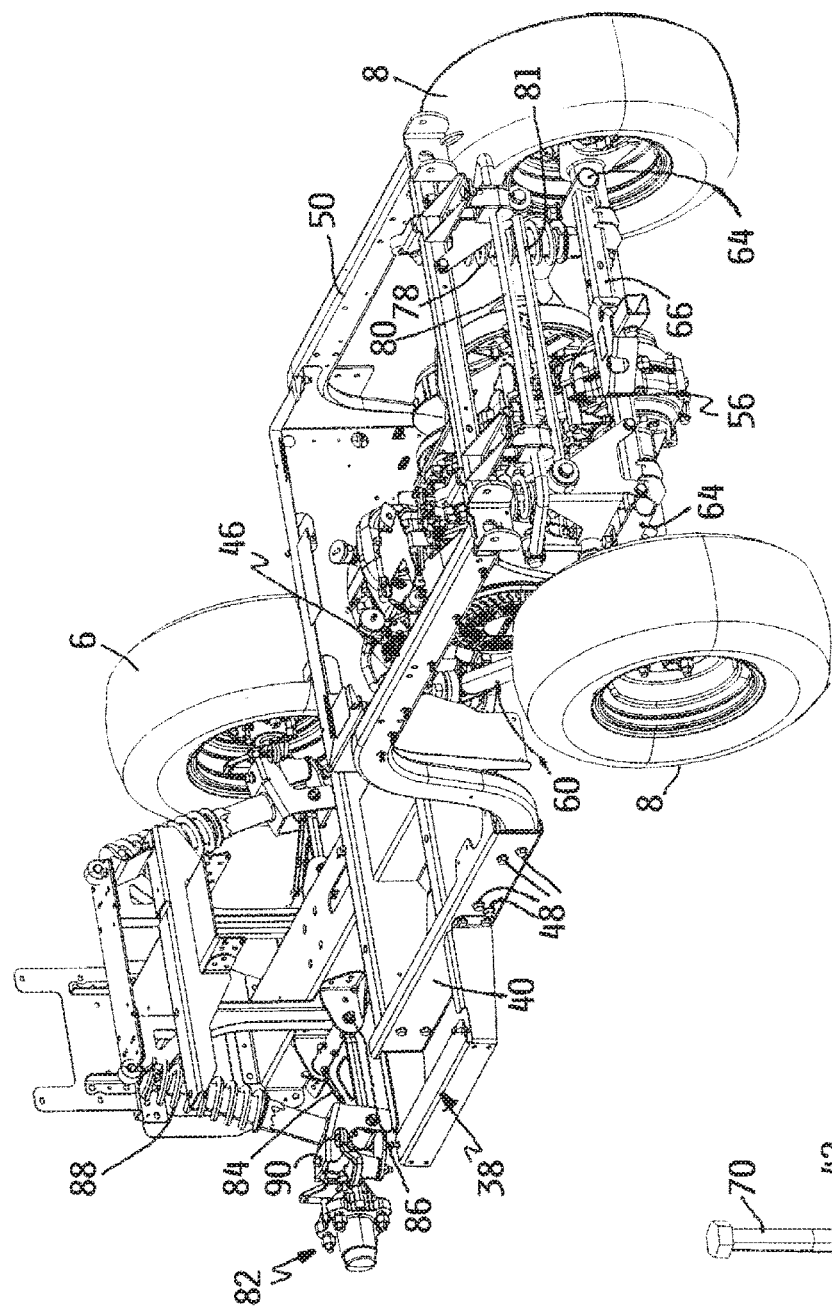
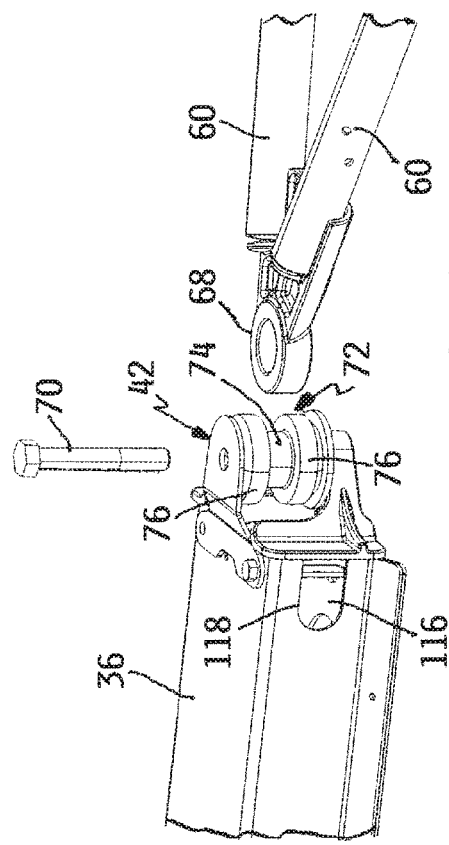
FIG. 3
FIG. 4

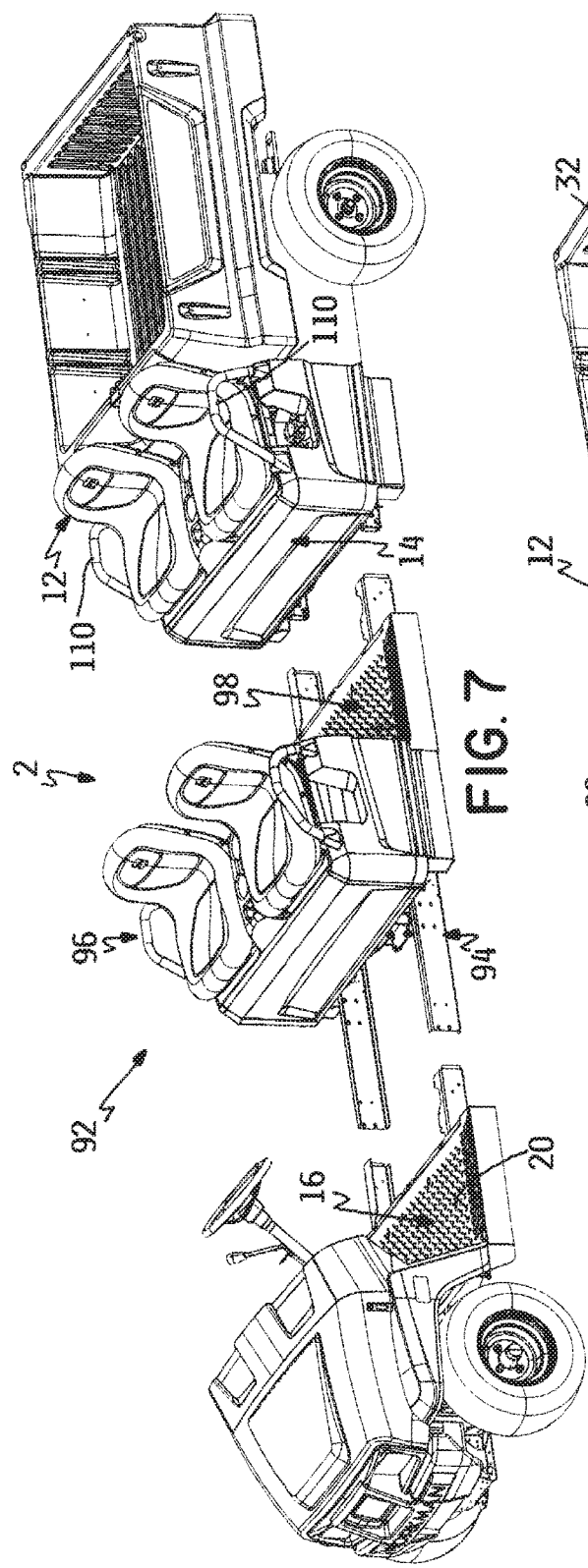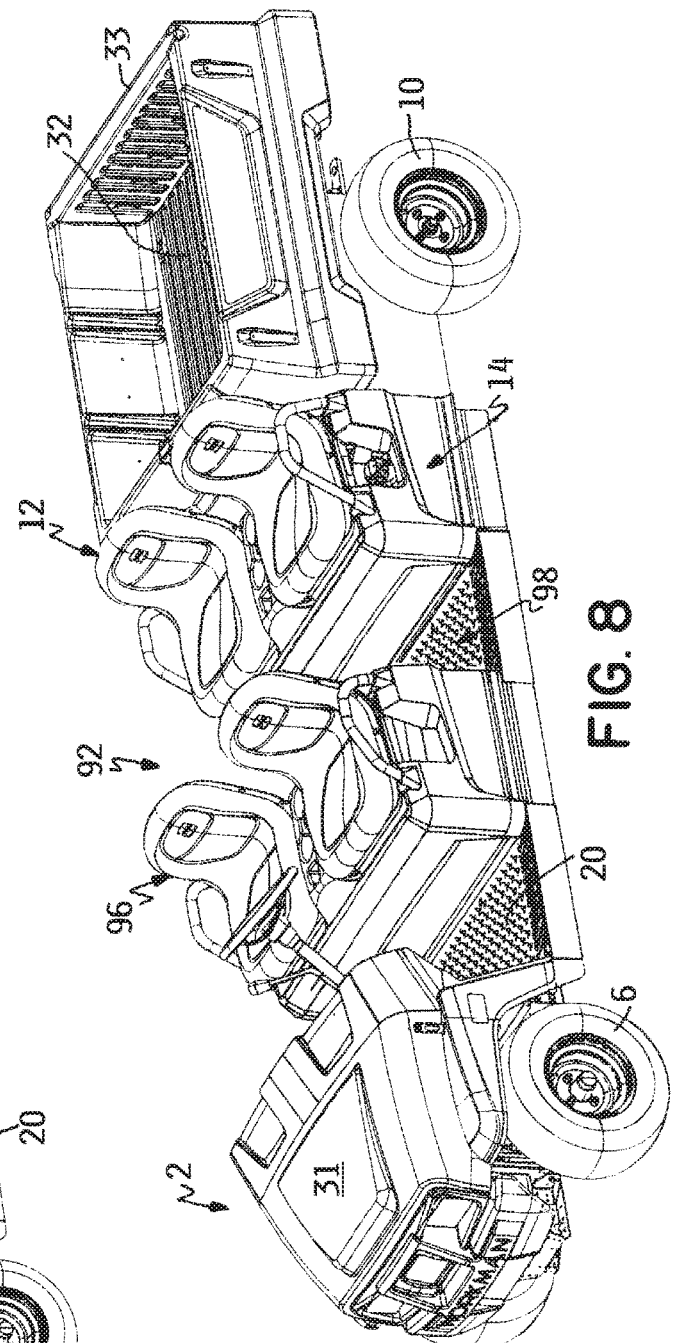

METHOD AND KITS FOR CONVERTING A TWO SEAT UTILITY VEHICLE TO A FOUR SEAT CONFIGURATION AND FOR PROVIDING AN EXTENDED BED THEREON

TECHNICAL FIELD

This invention relates to a utility vehicle for performing outdoor ground maintenance activities on ground and turf surfaces, landscapes, and the like.

BACKGROUND OF THE INVENTION

Grounds maintenance utility vehicles, such as the Toro® Workman®, are well known. These small vehicles have an operator compartment that carries a driver and a passenger in a side-by-side seating arrangement. A bed is provided on the vehicle behind the operator compartment for carrying various equipment, supplies, tools, and the like, which are useful in establishing, maintaining, renovating and grooming landscapes and ground or turf surfaces. Various ground grooming or working tools or implements, such as sprayers, spreaders, topdressers, aerators, and the like, may be coupled to or carried on the vehicle according to the operation the user wishes to perform.

Traditionally, utility vehicles have been provided with side-by-side seating for two people only. There is a market that is smaller and less predictable for utility vehicles having two rows of seating for carrying four people. In order to serve this market, some manufacturers of utility vehicles have manufactured and stocked two separate vehicles, one having a two seat configuration and the other having a four seat configuration. However, due to the less predictable and harder to forecast four seat market, the manufacturer is presented with an unpleasant choice. The manufacturer can build a large number of four seat utility vehicles and risk overbuilding with the attendant financial costs that are imposed if excess inventory results due to weaker than expected demand. Or, alternatively, the manufacturer can be conservative in the number of four seat utility vehicles that are built and risk not being able to satisfy unexpected customer demand. This invention is directed to removing the need to make this choice while satisfying whatever customer demand for four seat utility vehicles might appear in the market.

In addition, the standard bed provided on the vehicle is fairly short, typically four feet in length from front to back. This limits the load carrying capacity of the bed. A longer bed could theoretically be used to replace the standard bed, but the extra length would simply be cantilevered off the rear end of the vehicle. Such a cantilevered portion of the longer bed would not be properly supported and may cause the bed to fracture if large loads are placed atop the cantilevered portion. Moreover, such a cantilevered portion would increase the risk of hitting something during tight turns of the vehicle. Accordingly, it would also be advantageous to be able to use a longer than standard bed on a utility vehicle without facing the above-noted problems.

SUMMARY OF THE INVENTION

One aspect of this invention relates to a method of converting a utility vehicle from a two seat configuration to a four seat configuration. The method comprises providing a utility vehicle having a frame that carries a pair of front wheels and a pair of rear wheels for supporting the frame for rolling movement over a ground or turf surface. An operator compartment is located on the frame between the front and rear wheels, the operator compartment including a first seat assembly for seating a driver and a passenger in a side-by-side manner and a first floorboard on which the legs of the driver and the passenger rest when the driver and the passenger are seated on the first seat assembly. A load carrying first bed is carried on the frame behind the operator compartment. The frame is separable into a front frame portion that carries the front wheels and a rear frame portion that carries the rear wheels. The method further comprises providing a seat extension kit having a frame extension, a second seat assembly for seating two additional people in a side-by-side manner, and a second floorboard. The second seat assembly and the second floorboard are carried by the frame extension when the seat extension kit is assembled. Finally, the method contains the steps of separating the front and rear frame portions for movement relative to one another, moving the front and rear frame portions away from one another to create a gap therebetween, and installing the seat extension kit into the gap to expand the utility vehicle from a two seat configuration to a four seat configuration due to the addition of the second seat assembly and the second floorboard to the vehicle.

Another aspect of this invention relates to an expandable utility vehicle system which can be converted from a two seat configuration to a four seat configuration. The system comprises a utility vehicle having a frame that carries a pair of front wheels and a pair of rear wheels for supporting the frame for rolling movement over a ground or turf surface. An operator compartment is located on the frame between the front and rear wheels, the operator compartment including a first seat assembly for seating a driver and a passenger in a side-by-side manner and a first floorboard on which the legs of the driver and the passenger rest when the driver and the passenger are seated on the first seat assembly. A load carrying first bed is carried on the frame behind the operator compartment. The frame is separable into a front frame portion that carries the front wheels and a rear frame portion that carries the rear wheels. The system further comprises a seat extension kit having a frame extension, a second seat assembly for seating two additional people in a side-by-side manner, and a second floorboard. The second seat assembly and the second floorboard are carried by the frame extension when the seat extension kit is assembled between the front and rear portions of the vehicle frame to provide an additional row of seating in the vehicle such that the vehicle is capable of carrying four people rather than two people.

Yet another aspect of this invention relates to a utility vehicle which comprises a frame that is separable at a location passing through an operator compartment of the vehicle into front and rear sections with a seat base and a seat assembly of the operator compartment remaining with the rear section and the operator compartment forward of the seat base and the seat assembly remaining with the front section. A seat extension kit is received between the separable front and rear sections of the frame. The seat extension kit has a frame extension, a seat module, and a floorboard module that may be inserted between the separable front and rear sections of the frame with the frame extension of the extension kit being fastened to the front and rear sections of the frame by a plurality of fasteners which use pre-existing fastener holes provided in the front and rear sections of the frame and in the frame extension. The seat module when installed forms a new front row of seating and the floorboard module when installed extends between the seat module and the seat base and seat assembly which seat base and seat assembly form a rear row of seating located behind the installed seat and floorboard modules of the seat extension kit, thereby expanding the utility vehicle's seating capacity.

BRIEF DESCRIPTION OF THE DRAWINGS

This invention will be described more completely in the following Detailed Description, when taken in conjunction with the following drawings, in which like reference numerals refer to like elements throughout.

FIG. 3 is a perspective view from the rear of the frame of the vehicle shown in FIG. 2;

FIG. 4 is an exploded perspective view of a portion of the frame of the vehicle shown in FIG. 2, particularly illustrating a clevis/pin coupling used in the frame between front and rear frame portions;

FIG. 7 is a perspective view similar to FIG. 6, but illustrating the seat extension kit having been dropped into the gap between the split front and rear sections of the vehicle;

FIG. 8 is a perspective view similar to FIG. 7, but showing the vehicle having been reunited as a complete vehicle with the seat extension kit secured between the previously split front and rear sections of the vehicle to provide seating for four people rather than two people as in the original vehicle shown in FIG. 1;

DETAILED DESCRIPTION

Figure 1:
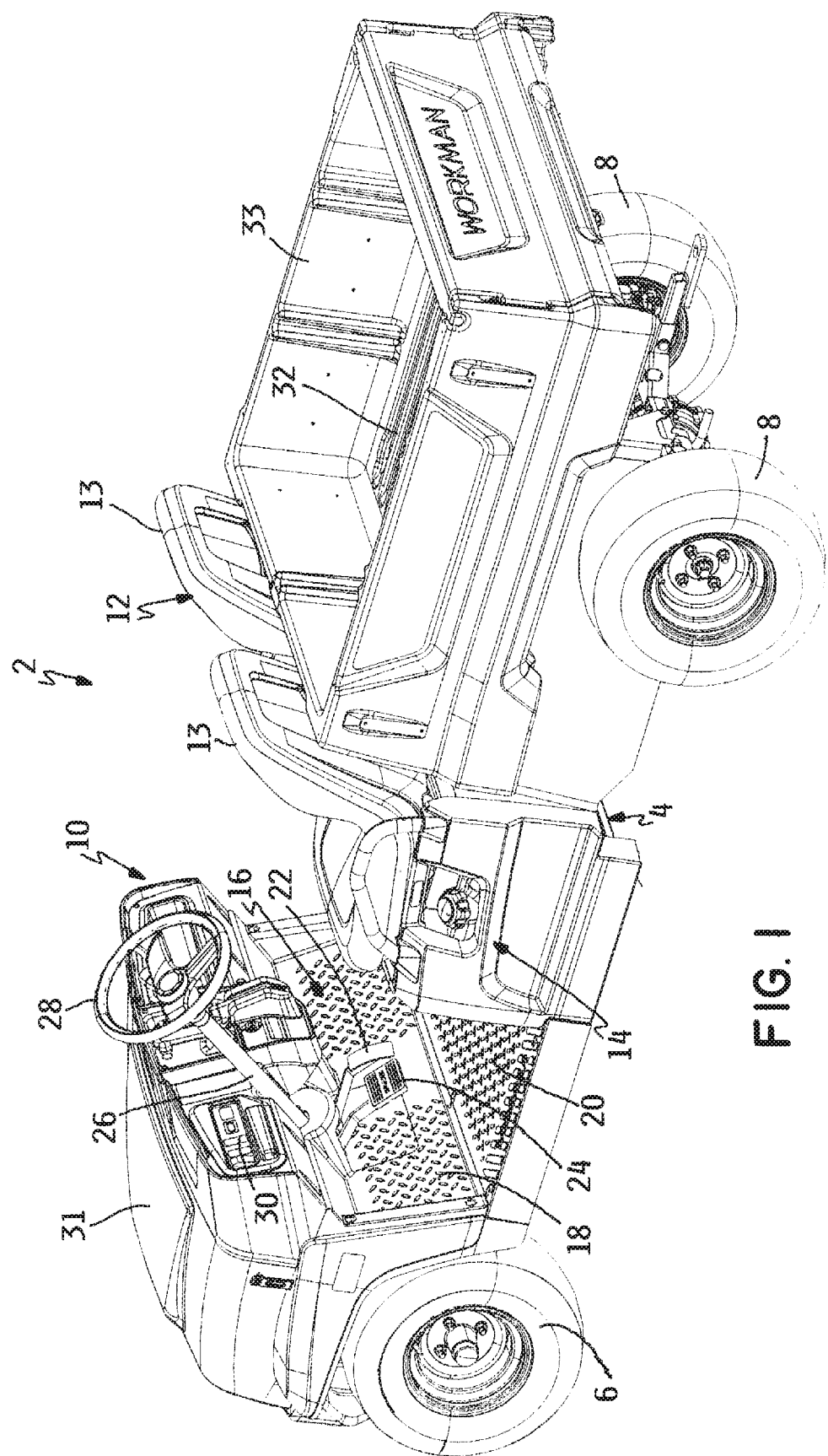
FIG. 1 is a perspective view of one embodiment of a utility vehicle according to this invention.

FIG. 1 depicts one embodiment of an outdoor utility vehicle 2 to which the method and kit of this invention is directed. Vehicle 2 as depicted is a Workman® utility vehicle manufactured and sold by The Toro Company, the assignee of this invention. Similar vehicles are manufactured and sold by other companies, such as the Gator™ utility vehicle of Deere & Company. This invention is equally applicable to all such utility vehicles.

As shown in FIG. 1, vehicle 2 has a frame 4 that carries a pair of laterally spaced front wheels 6 and a pair of laterally spaced rear wheels 8 for supporting frame 4 for rolling movement over a ground or turf surface. An operator compartment 10 is located on frame 4 between front and rear wheels 6 and 8. Operator compartment 10 includes a seat assembly 12 configured to provide a row of side-by-side seating for a driver and a passenger of vehicle 2, a box like seat base 14 which carries seat assembly 12, a floorboard 16 made in two separate parts comprising an upwardly and forwardly inclined front portion 18 and a horizontal rear portion 20 on which the legs of the driver and the passenger rest when they are seated on seat assembly 12, an accelerator pedal 22, a brake pedal 24, and a steering column 26 that mounts a steering wheel 28 located in front of the seated driver. Seat assembly 12 may comprise a pair of side-by-side bucket seats 13 or an elongated bench type seat (not shown). Operator compartment 10 also includes an upper dashboard 30 located above accelerator and brake pedals 22, 24 for carrying various other vehicle operational controls that are easily accessible by the seated driver.

In addition to the above, a front hood 31 is carried on frame 4 forward of operator compartment 10. A load carrying bed 32 is carried on frame 4 behind operator compartment 10. Bed 32 can in some embodiments of this invention comprise the floor of a dump box 33 having a pivotal tailgate as shown in FIG. 1. Alternatively, bed 32 can simply be a planar flat surface. Preferably, bed 32 has a length that is approximately equal to the front-to-back distance of operator compartment 10 to provide bed 32 with a significant load carrying capacity.

Figure 2:
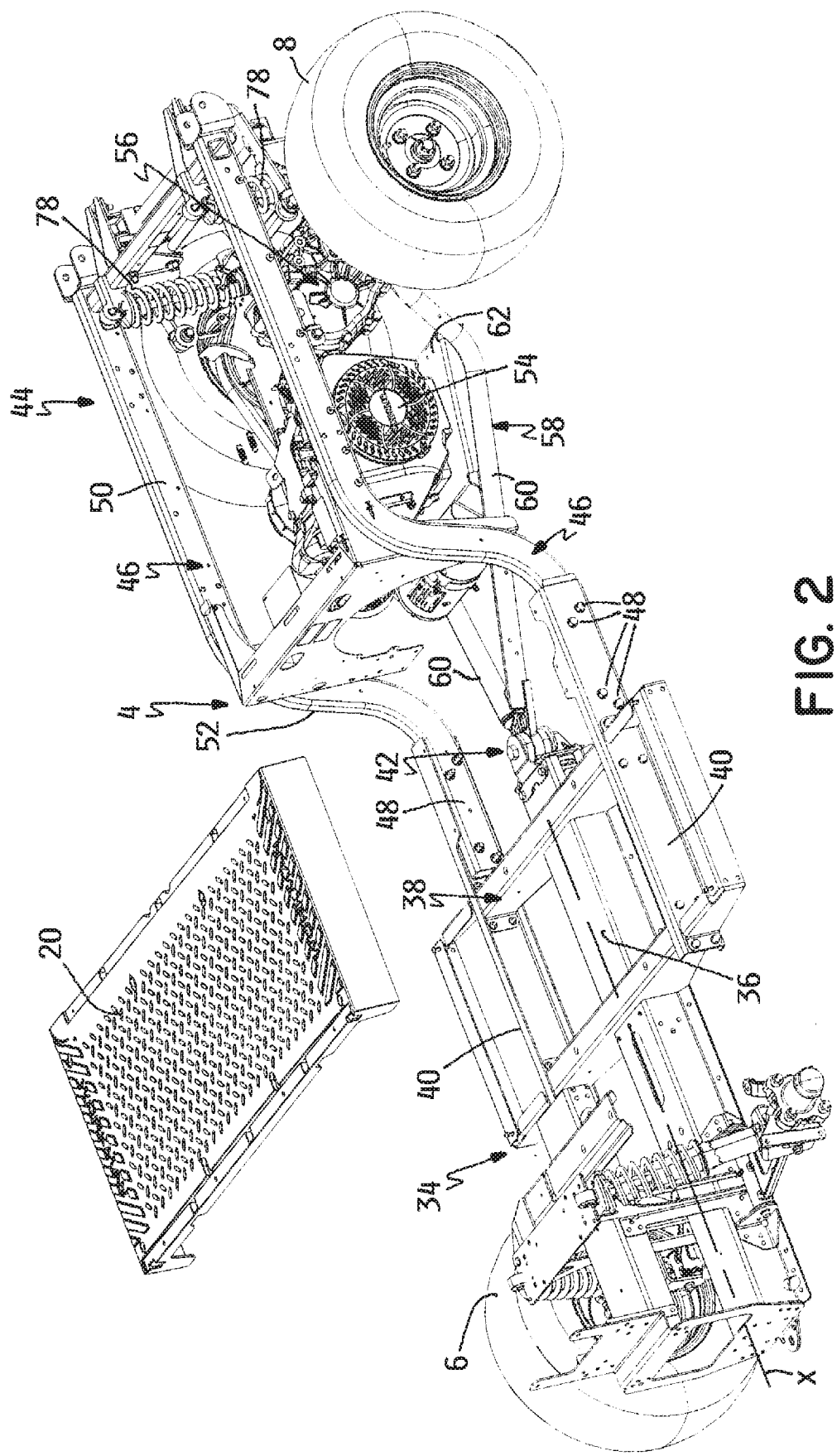
FIG. 2 is a perspective view of a portion of the vehicle of FIG. 1, particularly illustrating the frame of the vehicle and a portion of the floorboard of the vehicle.

Referring now to FIG. 2, frame 4 comprises a front frame portion 34 that includes a central, hollow, fore-and-aft extending, and four-sided box beam 36 having a laterally extending, substantially rectangular, box frame 38 over the rearward portion thereof. Rear floorboard portion 20, which has been shown in exploded form in FIG. 2 for the sake of clarity, is normally carried on top of box frame 38 to substantially completely overlie and cover box frame 38. Box frame 38 includes two fore-and-aft extending front side rails 40 that are disposed at equal distances from and laterally outside of the fore-and-aft axis x of central beam 36. The rear ends of front side rails 40 extend rearwardly of the rear end of central beam 36. A clevis mount 42 is releasably bolted or otherwise secured to the rear end of central beam 36 to provide a releasable clevis/pin coupling, the purpose of which will be described hereafter.

Referring further to FIG. 2, frame 4 further comprises a rear frame portion 44 that includes two fore-and-aft extending rear side rails 46. Rear side rails 46 are rigidly connected together to each other by various cross members. In addition, rear side rails 46 are laterally spaced apart by a distance slightly less than the distance between the pair of front side rails 40. This allows the front ends of rear side rails 46 to overlap and be bolted to the rear ends of front side rails 40 using a plurality of bolts 48 as shown in FIG. 2 to unite front and rear frame portions 34, 44 of frame 4 together. However, as will be explained in more detail hereafter, this bolt type connection is releasable as part of this invention to separate front and rear frame portions 34, 44.

Each rear side rail 46 comprises a substantially horizontal forward segment 48, a substantially horizontal rearward segment 50, and an S-shaped intermediate segment 52 that joins forward and rearward segments 48, 50 together with rearward segment 50 being elevated above forward segment 48 by the height provided by the S-shaped curve of intermediate segment 52. This elevation is necessary to allow a prime mover 54, such as, but not limited to, an internal combustion engine, and a traction drive system 56, such as, but not limited to, a mechanical differential powered by prime mover 54, to be located beneath rearward segments 50 of rear side rails 46. Bed 32 is carried atop rearward segments 50 of rear side rails 46 with a rearward portion of bed 32 overhanging past the rear ends of rear side rails 46 if so desired. See FIG. 1.

As further shown in FIG. 2, rear frame portion 44 further includes a subframe 58 comprising a pair of cylindrical side members 60. Side members 60 have forward portions that are inwardly inclined relative to one another to converge towards one another as side members 60 extend forwardly. The converging forward portions of side members 60 have a platform 62 at the rear thereof where the space between side members 60 is the widest. Platform 62 carries prime mover 54 of vehicle 2. In addition, side members 60 of subframe 58 have raised rearward portions 64 that are united by a rear cross beam 66 as best shown in FIG. 3. Raised rearward portions 64 of side members 60 carry traction drive system 56 that powers rear wheels 8 of vehicle 2. Any appropriate power supplying couplings, e.g. a mechanical drive shaft in the case where prime mover 54 is an engine and traction drive system 56 is a mechanical differential, may be made between prime mover 54 and traction drive system 56. Thus, rear wheels 8 comprise a pair of non-steerable drive wheels that self-propel vehicle 2 over the ground using the power supplied by prime mover 54 acting through traction drive system 56.

Referring now to FIG. 4, the converging forward portions of side members 60 are connected together at their forwardmost ends by a horizontal, forwardly extending eyelet 68. Eyelet 68 of side members 60 of subframe 58 is received between the flanges of clevis mount 42 located at the rear end of central beam 36 of front frame portion 34. This permits bolt or pin 70 70 which is supported by the vertically spaced flanges of clevis mount 42 to pass through an elastomeric, dumbbell shaped bushing or isolator 72. Isolator 72 has a central through bore through which bolt or pin 70 passes. Isolator 72 is also shaped to provide a reduced diameter central portion 74 around which eyelet 68 is placed with enlarged diameter ends 76 of isolator 72 overlying the top and bottom surfaces of eyelet 68 after one of the enlarged diameter ends 76 of isolator 72 is compressed enough to pull the compressed end of isolator 72 through eyelet 68 to preassemble isolator 72 in eyelet 68 prior to assembly of eyelet 68 and isolator 72 in clevis mount 42.

Isolator 72 is sufficiently compressible and flexible to provide some relative motion between eyelet 68 and clevis mount 42. This structure allows subframe 58 that carries prime mover 54, traction drive system 56, and rear wheels 8 to pitch up and down about a substantially horizontal axis and to roll slightly side to side about a longitudinal axis relative to front frame portion 34 during operation of vehicle 2 over uneven ground. This prevents the transmission of shocks to operator compartment 10 and helps rear wheels 8 remain in contact with the ground over uneven terrain to improve traction performance. Despite this pitching and rolling motion, subframe 58 is still sufficiently connected to the rest of rear frame portion 44, e.g. by various coil over shock absorbers 78, other connecting linkages 80 and 81, and the like, to form a part of rear frame portion 44, but just a part that has the relative pitching and rolling motion described above.

Front wheels 6 of vehicle 2 are coupled to opposite sides of a forward portion of central beam 36 of front frame portion 34 by substantially identical front wheel suspension assemblies 82. The left front wheel 6 has been removed from FIGS. 2 and 3 to allow the left front wheel suspension assembly 82 to be visible. As can be seen in FIG. 2, each front wheel suspension assembly 82 includes a wishbone suspension arm 84 pivotally connected to the adjacent side of central beam 36 by a horizontal pivot pin 86. Pivot pin 86 provides an upward and downward ground following action for the attached front wheel 6. A coil over shock absorber 88 extends between suspension arm 84 and another portion of frame 4 to absorb and dampen the upward and downward motion of the attached front wheel 6 to increase the comfort of the ride and the stability of vehicle 2. The outer end of suspension arm 84 includes a substantially vertical pivot 90 to allow the attached front wheel 6 to be swung or steered about the axis of pivot 90 when the motion of steering wheel 28 is communicated to the attached front wheel 6 through a steering linkage (not shown). Thus, front wheels 6 of vehicle 2 comprise a pair of unpowered but steerable wheels. In an alternative embodiment, front wheels 6 could be selectively powered in an on demand four wheel drive mode or continuously powered when rear wheels 8 are powered in a full time four wheel drive mode.

Figure 5:
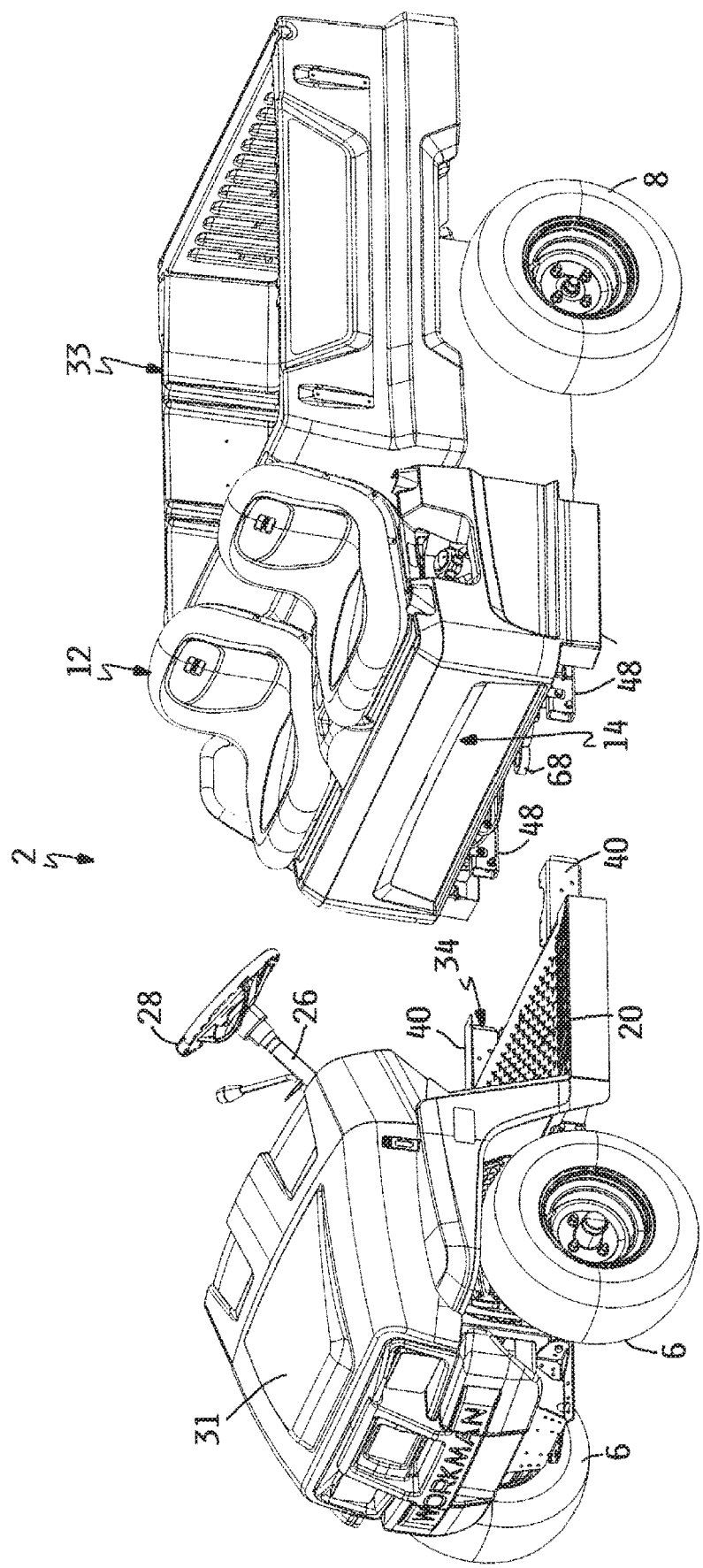
FIG. 5 is an exploded perspective view of a seat extension kit that is used according to a method of this invention to convert the vehicle of FIG. 1 from a two seat to a four seat configuration.

It may not be immediately apparent from the above, but the primary physical connections between front frame portion 34 and rear frame portion 44 of vehicle 2 comprise side rail bolts 48 that secure the rear ends of front side rails 40 to the front ends of rear side rails 46 along with bolt or pin 70 of clevis mount 42 that couples central beam 36 of front frame portion 34 to eyelet 68 of subframe 58 of rear frame portion 44. When side rail bolts 48 are loosened and removed and when bolt or pin 70 of clevis mount 42 coupling is unbolted and pulled upwardly out of clevis mount 42, vehicle 2 may be pulled apart into two separate front and rear sections. This is shown in FIG. 5 hereof. Isolator 72 has been removed from eyelet 68 of subframe 58 of rear frame portion 44 in FIG. 5, where it would normally be retained when vehicle 2 is split apart, for the sake of more clearly showing eyelet 68 in FIG. 5.

As is clear in FIG. 5, vehicle 2 preferably, though not necessarily, splits apart through the middle of operator compartment 10. The front section of vehicle 2 includes front frame portion 34, the steerable front wheels 6, all of operator compartment 10 forward of seat base 14 and the seat assembly 12, and hood 31. Thus, with respect to operator compartment 10, the entire floorboard 16, including both the inclined front portion 18 and horizontal rear portion 20 thereof, steering column 26 and steering wheel 28, accelerator pedal 22, brake pedal 24, and dashboard 30 with its operational controls all remain with the front section of vehicle 2. All of the rest of vehicle 2, including seat base 14 and seat assembly 12 of operator compartment 10, comprises the rear section of vehicle 2. One or more wheeled dollies (not shown) are preferably used to support one or both of the sections of vehicle 2 as and after vehicle 2 is split into the sections thereof to prevent the separated sections from tipping about their wheels into contact with the ground and to maintain the separated sections in their normally horizontal orientations.

Figure 6:
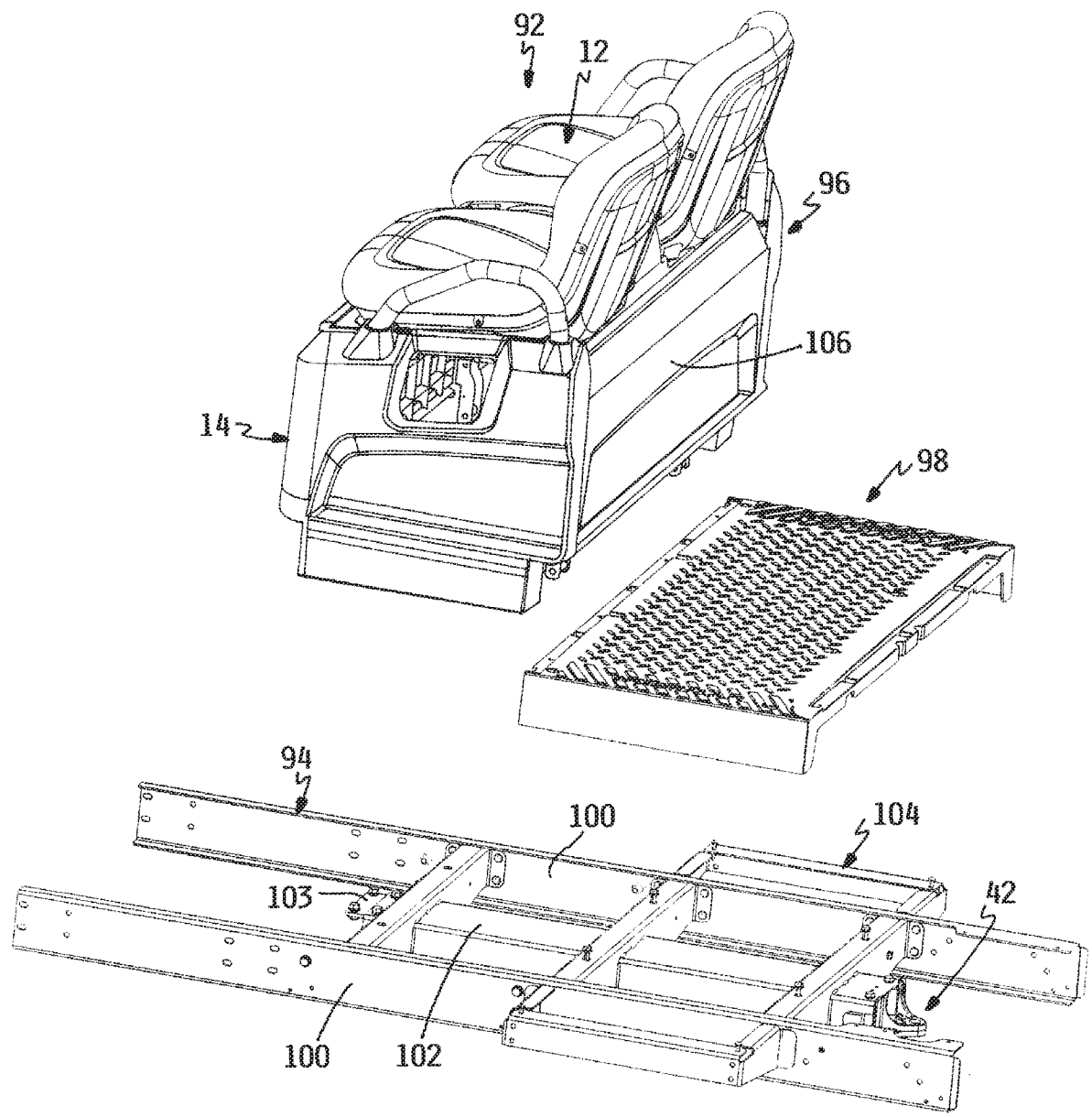
FIG. 6 is a perspective view of the vehicle of FIG. 1, particularly illustrating the vehicle having been split apart into front and rear sections in order to receive the seat extension kit of FIG. 5 in the gap therebetween.

Once vehicle 2 is split apart as described above, this invention further comprises a multi-passenger seat extension kit 92 for converting vehicle 2 to carry four people rather than two people. Seat extension kit 92 is shown in FIG. 6 in an exploded form. Seat extension kit 92 comprises three major components: 1.) a frame extension 94, 2.) a seat module 96; and 3.) a floorboard module 98. These components will be described in turn.

Frame extension 94 comprises a pair of side rail extensions 100 and a central beam extension 102 that are united together by various cross members. The forward portions of side rail extensions 100 overlie and are bolted to the forward portions of front side rails 40 of front frame portion 34. In addition, once clevis mount 42 is removed from the rear end of central beam 36 of front frame portion 34, the front end of central beam extension 102 includes attachment flanges 103 that bolt to the rear end of central beam 36 of front frame portion 34 to allow central beam extension 102 to lengthen central beam 36 by approximately 36 inches or so. Note that clevis mount 42, a portion of which is shown in FIG. 6, is then remounted to the rear end of central beam extension 102. Frame extension 94 further includes a laterally extending, substantially rectangular, box frame 104 over the rearward portion thereof that is a substantial duplicate of box frame 38 on front frame portion 34.

Floorboard module 98 comprises a substantial duplicate of the horizontal rear portion 20 of floorboard 16 on front frame portion 34. Floorboard module 98 will be attached to box frame 104 on frame extension 94. As is clear from FIG. 6, floorboard module 98 when so attached will be behind seat module 96. As shown best in FIGS. 7 and 8, when seat extension kit 92 is entirely installed in vehicle 2, floorboard module 98 will become the floorboard for the original seat assembly 12, which now forms a rear row of passenger seats in vehicle 2.

Turning finally to seat module 96, seat module 96 comprises a substantial duplicate of seat base 14 and the original seat assembly 12 of vehicle 2. Thus, to promote cost savings and maintain a uniform look in the extended vehicle 2, seat module 96 preferably, but not necessarily, uses the same molded seat base front panel, both seat base side panels, and the seat pan that supports the seats 13 of seat assembly 12 which seat pan closes off the top of the seat base 14. Seat base 14 for the original seat assembly 12 was open along the rear side as that side was positioned adjacent to and/or abutted against the raised section of rear frame portion 44 to be largely hidden from view. However, since the rear side of seat module 96 will be exposed and be clearly visible to the passengers in the rear row of seats or to people outside vehicle 2, seat module 96 includes an additional rear panel 106 that closes off the open rear side of the seat base of seat module 96 in a way that was not true in the original seat base 14. In order to save cost, rear panel 106 of seat module 96 is preferably a duplicate of the molded front panel used as the front wall of the original seat base 14 to avoid any extra tooling costs for making rear panel 106. When seat module 96 is installed on frame extension 94 forwardly of floorboard module 98, floorboard module 98 will entirely fill in the space between seat module 96 and the rear row of passenger seats. Seat assembly 12 now added by seat module 96 provides the new side-by-side front driver and passenger seating and will be positioned in the same place as the original driver and passenger seat assembly 12 when front and rear frame portions 34, 44 are reunited. In this case, floorboard 16 which remained on front frame portion 34 when front and rear frame portions 34, 44 were originally split becomes the floorboard for the newly added seats.

FIG. 7 depicts seat extension kit 92 in a fully assembled form and placed into the gap between the split front and rear frame portions 34, 44 of vehicle 2. If front and rear frame portions 34, 44 of vehicle 2 are then rolled into engagement with frame extension 94 of seat extension kit 92, the forward portions of side rail extensions 100 can be bolted to the forward portions of front side rails 40 of front frame portion 34 of vehicle 2, central beam extension 102 can be bolted to the rear end of central beam 36 of front frame portion 34 of vehicle 2, and the rearward portions of side rail extensions 100 can be bolted to the front of rear side rails 46 of rear frame portion 44 of vehicle 2 as in the non-split vehicle. Bolt or pin 70 and then be reinserted into clevis mount 42, which has been repositioned to the rear end of central beam extension 102 as described earlier herein. This recouples eyelet 68 of subframe 58 of rear frame portion 44 of vehicle 2 to clevis mount 42 that is now positioned on the rear end of central beam extension 102 of frame extension 94.

While it is possible and perhaps in some cases preferable to preassemble the components of seat extension kit 92 together before they are installed in the split vehicle, seat extension kit 92 may in many cases be assembled in situ component by component. In this assembly scenario, frame extension 94 of seat extension kit 92 would first be installed without such frame extension 94 carrying either seat module 96 or floorboard module 98. This alone would reunite front and rear frame portions 34, 44 of vehicle 2. With frame extension 94 in place, seat module 96 and floorboard module 98 could then be mounted to frame extension 94. In the case of seat module 96, seat base 14 may have to be assembled from disassembled component parts thereof and seat assembly 12 installed atop the assembled seat base. This assembly of seat module 96 can also be done component by component on top of the assembled and installed frame extension 94 or seat module 96 could be assembled separately from frame extension 94 and then dropped onto the assembled and installed frame extension 94. Floorboard module 98 is a single piece and is preferably placed onto frame extension 94 before seat module 96.

There may be various ancillary components that also extend between the front and rear sections of vehicle 2 besides the primary physical connections described above. Such ancillary components can comprise hydraulic hoses (not shown), wiring harnesses 112, mechanical control cables 114 such as Bowden cables, and the like. See FIG. 11. The need to disconnect, extend or replace such ancillary components was not discussed above with respect to the conversion of vehicle 2 from a two seat to a four seat configuration as such ancillary components are fairly easy to deal with by comparison. Moreover, there are steps that can be taken to allow such ancillary components to accommodate the conversion with a minimal need for disconnection of replacement.

For example, to ease the task of making the conversion, any hydraulic hoses or wiring harness running from front to back in the two seater production version of vehicle 2 can be given some extra length or slack by putting the hoses or wiring harness into an S-shaped length extending curve. Thus, when front and rear frame portions 34, 44 of vehicle 2 are fully spread apart, the hoses and wiring harness will be able to still extend as far as need be simply by straightening out the S-shaped curve to use the available slack, thus avoiding the need for splicing in or connecting additional lengths of hose or wiring harness. All of the operational controls using mechanical wires like Bowden cables or the like, e.g. the parking brake, the choke, the shift control, the throttle, etc., will now be located in operator compartment 10 or be provided on dashboard 30. Thus, while the original equipment cables for such controls will need to be replaced with longer lengths in the conversion, the placement of the controls within operator compartment 10 does not become a hindrance to the conversion since the control locations themselves remain fixed and unchanging.

Figure 11:
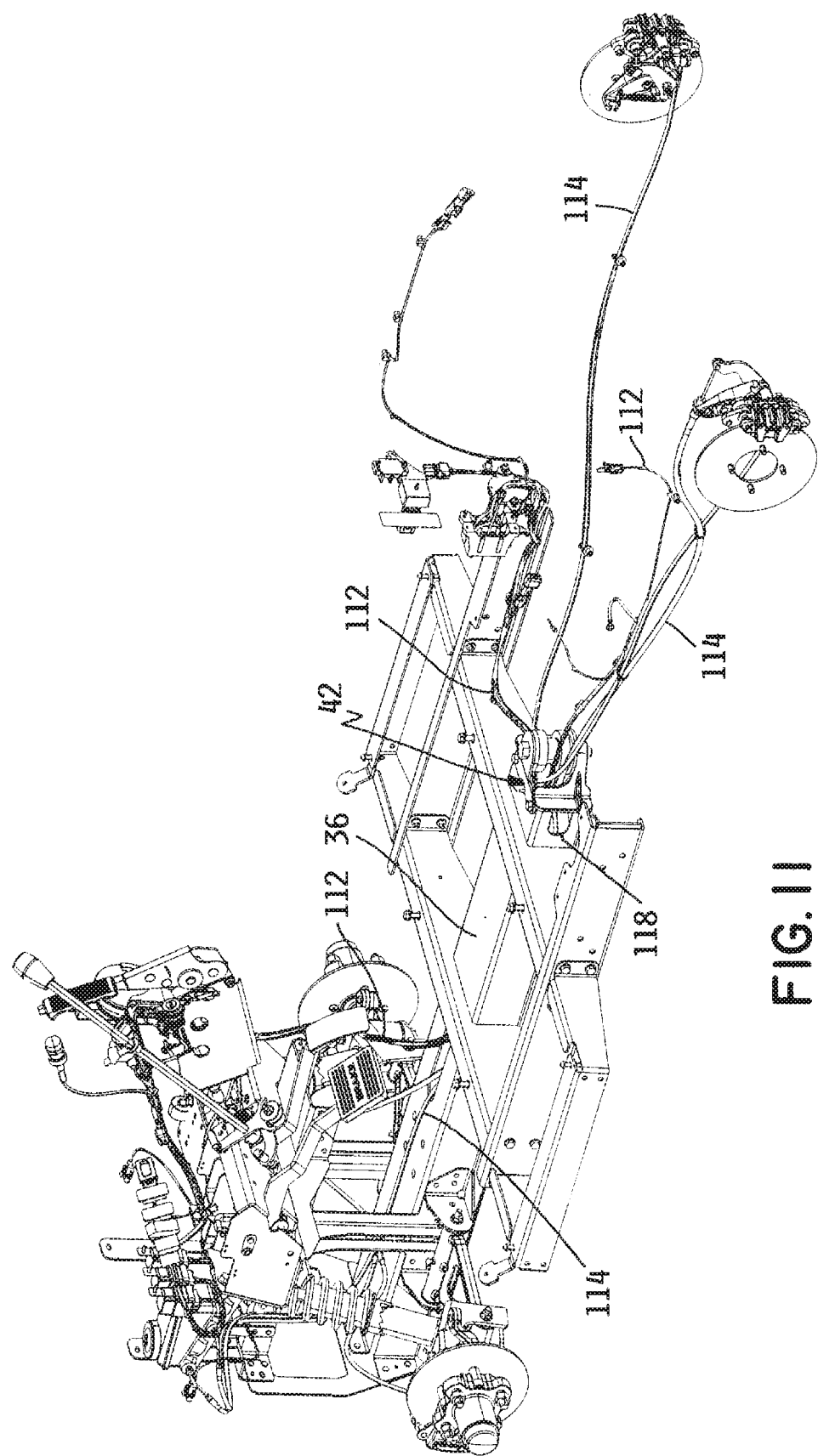
FIG. 11 is a perspective view of a portion of the vehicle of FIG. 1, particularly illustrating the hollow central beam of a front frame portion of the vehicle and the routing of various flexible components that extend between the front and rear frame portions of the vehicle through the interior of the central beam.

Referring now to FIG. 11, the ancillary components comprising the aforementioned elongated flexible connecting members, namely the hydraulic hoses, wiring harnesses 112, and control cables 114, are preferably routed from front frame portion 34 to rear frame portion 44 through the interior of central beam 36. These flexible connecting members are supported inside of central beam 36 by a lower wall 116 of central beam 36 that prevents the connecting members from falling out through the bottom of central beam 35. Lower wall 116 of central beam 36 is best seen in FIG. 4. Returning now to FIG. 11, the flexible connecting members exit the rear end of central beam 36 through one or more side openings 118 in each side wall of central beam 36 and through gaps or spaces in the rear of clevis 42.

Preferably, central beam extension 102 of extension kit 92 is shaped identically to central beam 36 to form a continuation of the open interior of central beam 36. Thus, all of the hydraulic hoses, wiring harnesses 112 and control cables 114 that necessarily pass from front frame portion 34 to rear frame portion 44 pass through the interior of central beam extension 102, are supported in the interior of central beam extension 102 by a lower wall of central beam extension 102 in the same manner as lower wall 116 of central beam 36, and exit the rear end of central beam extension 102 in the same manner as was true of central beam 36. Note that when extension kit is installed in vehicle 2, that clevis 42 is repositioned from the rear end of central beam 36 to the rear end of central beam extension 102. This routing of the hydraulic hoses, wiring harnesses 112 and control cables 114 in a single location along the fore-and-aft spine of vehicle 2 eases the task of converting vehicle 2 from a two seat to a four seat configuration.

Once seat extension kit 92 is fully installed in the split vehicle, the reassembled but extended vehicle will appear as shown in FIG. 8. The extended vehicle clearly can carry four people rather than two. Rear frame portion 44 of vehicle 2 still carries prime mover 54 and its related components, e.g. the fuel tank for prime mover 54 when prime mover 54 is an internal combustion engine is located within seat base 14 of the original seat assembly 12, as well as traction drive system 56, and bed 32. Thus, these major components do not have to be repositioned but simply remain with rear frame portion 44 when front and rear frame portions 34, 44 are split apart and rolled away from one another. Similarly, front frame portion 34 retains the operational controls for allowing the driver to operate and drive vehicle 2 over the ground, including the accelerator and brake controls that control the speed and operation of the traction drive and prime mover 54 as well as the other operational controls carried on dashboard 30. This substantially eases the task of converting vehicle 2 from a two seat to a four seat configuration.

With seat extension kit 92 of this invention, a manufacturer need not try to accurately predict the demand for four seat vehicles. Instead, the manufacturer need only build a two seat version and then supply the aforesaid seat extension kits to allow a customer who wants a four seat version to obtain one at the distributor level. Currently, manufacturers have to build as OEM products both two seat and four seat vehicles and stock and supply both to distribution. The conversion between the two seat base vehicle and the four seat extended vehicle using seat extension kit 92 of this invention can be done either at the manufacturer or distributor level depending upon how vehicles 2 are marketed by the manufacturer to end user customers in response to an order received from a customer.

Moreover, having the ability to switch back and forth between a two seat version and a four seat version of vehicle 2 at the customer level would allow a customer to make such a switch as he or she sees fit, such as in response to particular events. For example, a golf course customer might normally wish to have vehicle 2 in a two seat configuration for normal grounds maintenance purposes, but to convert vehicle 2 on a temporary basis into a four seat configuration for a particular purpose, such as hosting a golf tournament, a charity event, or the like. This would prevent the end user customer from having to purchase both a two seat vehicle and a separate four seat vehicle. Such a two vehicle purchase is obviously more expensive for the customer than purchasing a single two seat vehicle along with seat extension kit 92 of this invention.

Moreover, seat extension kit 92 of this invention is designed to fit into vehicle 2 and to be bolted therein using bolt hole locations that are pre-provided in both vehicle 2 as well as in frame extension 94 of seat extension kit 92. There is no need to cut frame 4 of the original vehicle apart in order to install seat extension kit 92 since frame 4 of vehicle 2 is already pre-split and ready to be unbolted and pulled apart. There is no need to weld seat extension kit 92 back into frame 4 in order to secure it. Thus, this invention involves a simple pre-split frame that can be unbolted, pulled apart, seat extension kit 92 dropped in, certain ancillary components such as control cables replaced with longer cables as provided in seat extension kit 92, and then re-bolted together. The advantages in this as opposed to a custom remanufacture method of making the conversion are apparent.

The use of seat extension kit 92 of this invention and the extended vehicle that results provides an opportunity to provide an extended bed 108 for use thereon. This aspect of the invention is shown in FIGS. 9 and 10.

Figure 9:
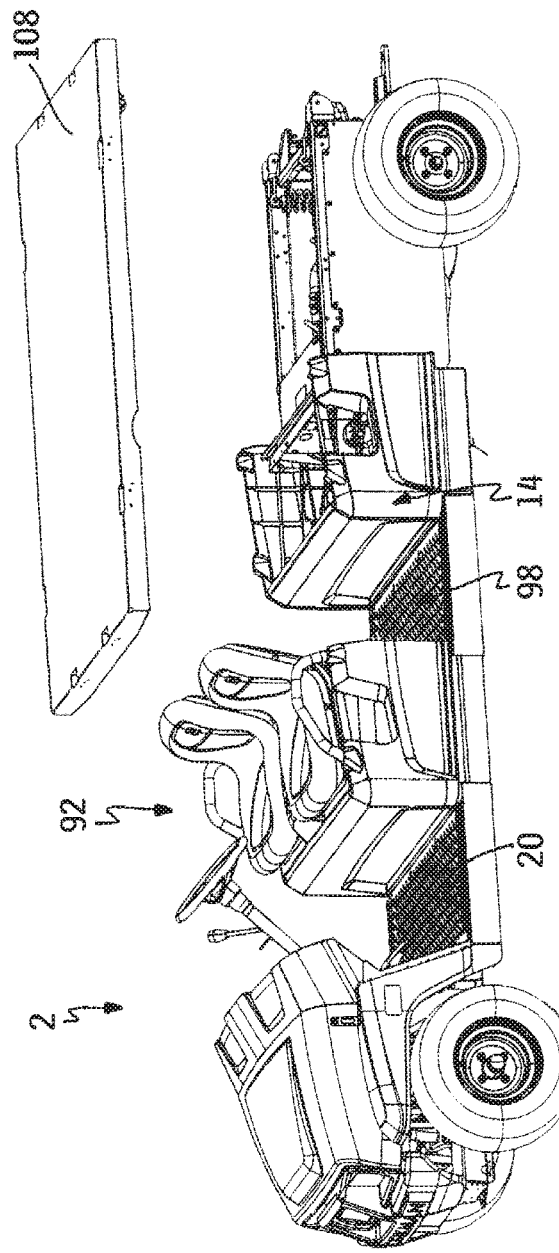
FIG. 9 is a perspective view of the vehicle shown in FIG. 8, particularly the seat assembly for the rear row of seating having been removed in preparation for receiving an extended bed that is shown in exploded form.
Figure 10:
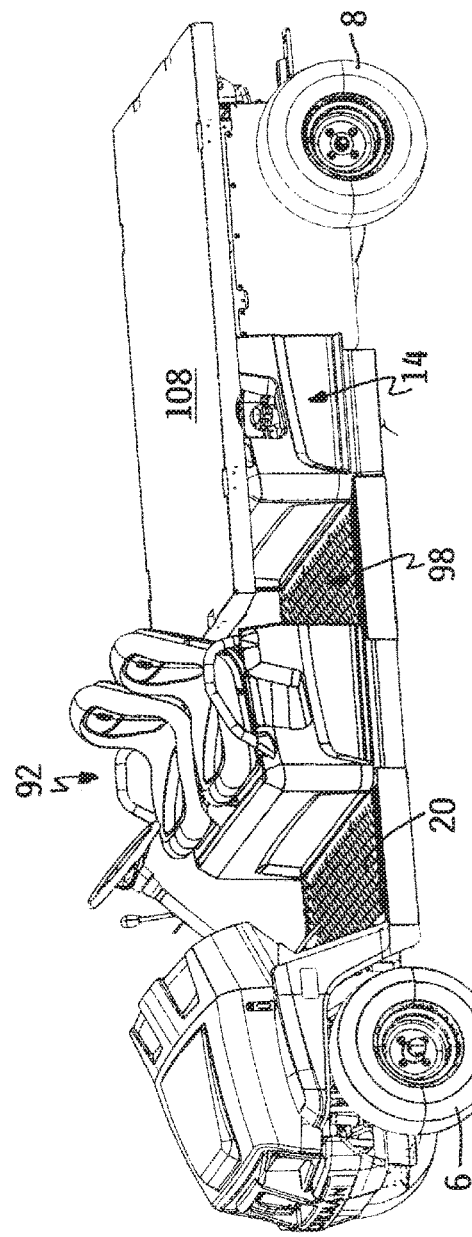
FIG. 10 is a perspective view similar to FIG. 9, but showing the extended bed in place on the vehicle.

Referring first to FIG. 9, it can be seen that the original seat assembly 12 is designed to be removable from seat base 14. In terms of simplifying this removal, seat assembly 12 can be mounted to the rest of seat base 14 by a quick release latching system (not shown). The quick release latching system allows the structure comprising the original seat assembly 12 to be removed and installed as a unit by releasing the latching system and pulling upwardly. Once removed, the structure comprising the original seat assembly 12 may be reinstalled by lowering the structure until it engages seat base 14 and pushing downwardly to cause the latching system to reengage. In any event for the purposes of the description of extended bed 108, the structure comprising the original seat assembly is shown as having been disconnected and completely removed in FIG. 9. In addition, to removal of these components, the side arm rests 110 are also removed from seat base 14 simply by unbolting arm rests 110 from seat base 14.

An extended bed kit is provided that includes a longer than normal extended bed 108. For example, in the unmodified vehicle as shown in FIG. 1 hereof, bed 32 normally has a four foot length. However, as shown in FIG. 9, in the extended vehicle resulting from the installation of seat extension kit 92, the extended bed 108, e.g. a six foot bed, can now be dropped down into place in vehicle 2 with the forward end of extended bed 108 overlying and extending forwardly of seat base 14 for the original seat assembly 12. In fact, extended bed 108 can extend forwardly over the newly added horizontal floorboard of seat extension kit 92 to terminate just short of the newly added front row of seats provided by seat module 96. In terms of mounting extended bed 108, two laterally spaced, fore-and-aft extending support channels or beams (not shown) will be first added to the open top of seat base 14 to help support the additional length of extended bed 108 on seat base 14. Extended bed 108 is then bolted in place using various bolt holes provided in rear frame portion 44 of vehicle 2 and various bolt holes provided in the support channels or beams added to seat base 14. If desired, extended bed 108 can be provided with raised sides by installing four staked or otherwise supported side walls around the periphery of extended bed 108, thus converting extended bed 108 into an extended box.

Extended bed 108 gives the user of the extended vehicle the option to sacrifice the four seat configuration that was provided by the use of seat extension kit 92 to gain a significantly longer load carrying bed. This can be quickly and easily done by popping out the original seat assembly 12, adding a couple of short support channels or beams to the top of the now upwardly open seat base 14, and then installing extended bed 108 atop vehicle 2 as described above. If or when the user wishes to go back to a four seat configuration, this process can be reversed with the user removing extended bed 108, removing any additional support channels or beams from seat base 14 that had been used to support the front end of extended bed 108, and then reinstalling the original seat assembly 12 and the side arm rests 110 atop seat base 14 to regain the rear row of seats.

Various modifications of this invention will be apparent to those skilled in the art. Accordingly, the scope of this invention is to be limited only by the appended claims.

The invention claimed is:

1. A vehicle, which comprises:
   (a) a frame that is separable at a location passing through an operator compartment of the vehicle into front and rear sections with a seat base and a seat assembly of the operator compartment remaining with the rear section and the operator compartment forward of the seat base and the seat assembly remaining with the front section;
   (b) a seat extension kit received between the separable front and rear sections of the frame, the seat extension kit having a frame extension, a seat module, and a floorboard module that may be inserted between the separable front and rear sections of the frame with the frame extension of the seat extension kit being fastened between the front and rear sections of the frame; and
   (c) the seat module when installed forming a new front row of seating and the floorboard module when installed extending between the seat module and the seat base and seat assembly of the operator compartment which seat base and seat assembly form a rear row of seating located behind the installed seat and floorboard modules of the seat extension kit, thereby expanding a seating capacity of the vehicle.

2. The vehicle of claim 1, wherein the frame extension of the seat extension kit is fastened to the front and rear sections of the frame by a plurality of fasteners which use pre-existing fastener holes provided in the front and rear sections of the frame and in the frame extension.

3. The vehicle of claim 1, wherein the front section comprises a hollow, fore-and-aft extending beam having an interior through which a plurality of flexible connecting members are routed to pass from the front section to the rear section.

4. The vehicle of claim 3, wherein the plurality of flexible connecting members are chosen from among the group of components consisting of hydraulic hoses, wiring harnesses and mechanical control cables.

5. The vehicle of claim 3, wherein the frame extension of the seat extension kit comprises a beam extension that forms a continuation of the interior of the beam of the front section when the seat extension kit is installed between the front and rear sections of the vehicle with the plurality of flexible connecting members additionally passing through an interior of the beam extension after first passing through the interior of the beam.

6. The vehicle of claim 1, wherein the seat base of the operator compartment comprises laterally spaced molded side panels and a front panel that extends between front ends of the side panels, and wherein the seat module of the seat extension kit includes a second seat base having front and side panels that are identical to the front and side panels used in the seat base of the operator compartment to decrease the cost of manufacturing the seat extension kit.

7. The vehicle of claim 6, wherein the second seat base includes a rear panel that extends between rear ends of the side panels, the rear panel of the second seat base comprising a duplicate of the front panel of the seat base to further decrease the cost of manufacturing the seat extension kit.

8. The vehicle of claim 6, wherein the floorboard module of the seat extension kit is identical to a floorboard of the operator compartment to further decrease the cost of manufacturing the seat extension kit.

9. The vehicle of claim 1, wherein the rear section of the vehicle carries an engine and traction drive system for powering a pair of rear drive wheels of the vehicle.

10. The vehicle of claim 1, wherein the front row and the rear row of seating are open to the air at the sides thereof.

* * * * *